(12) United States Patent
Lee

(10) Patent No.: US 11,392,377 B2
(45) Date of Patent: Jul. 19, 2022

(54) SYSTEM-ON-CHIP, DATA PROCESSING METHOD THEREOF, AND NEURAL NETWORK DEVICE

(71) Applicant: SAMSUNG ELECTRONICS CO., LTD., Suwon-si (KR)

(72) Inventor: Jonghyup Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/007,178

(22) Filed: Aug. 31, 2020

(65) Prior Publication Data

US 2021/0263737 A1 Aug. 26, 2021

(30) Foreign Application Priority Data

Feb. 20, 2020 (KR) ........................ 10-2020-0021128

(51) Int. Cl.
*G06F 9/30* (2018.01)
*G06F 17/15* (2006.01)
*G06T 3/40* (2006.01)
*H04L 1/00* (2006.01)

(52) U.S. Cl.
CPC ........ *G06F 9/3001* (2013.01); *G06F 9/30043* (2013.01); *G06F 17/156* (2013.01); *G06T 3/4084* (2013.01); *H04L 1/0008* (2013.01)

(58) Field of Classification Search
CPC .................................................. G06F 9/3001
See application file for complete search history.

(56) References Cited

U.S. PATENT DOCUMENTS

| 6,473,123 | B1 | 10/2002 | Anderson | |
|---|---|---|---|---|
| 7,432,932 | B2 | 10/2008 | San et al. | |
| 2019/0079867 | A1* | 3/2019 | Guirado | .............. G06F 12/0811 |
| 2020/0183848 | A1* | 6/2020 | Loh | ...................... G06F 12/0802 |
| 2021/0149984 | A1* | 5/2021 | Luo | ...................... G11C 7/1006 |

FOREIGN PATENT DOCUMENTS

| JP | 0785266 A | 3/1995 |
|---|---|---|
| JP | 2008107981 A | 5/2008 |
| KR | 100441079 B1 | 2/2004 |
| KR | 101152952 B1 | 6/2012 |
| KR | 101733346 B1 | 5/2017 |
| KR | 1020190069750 A | 6/2019 |

* cited by examiner

*Primary Examiner* — Michael J Metzger
(74) *Attorney, Agent, or Firm* — Sughrue Mion, PLLC

(57) ABSTRACT

A System-on-Chip (SoC) includes a first memory configured to store first data, a second memory, and a data processing circuit configured to divide the first data obtained from the first memory into a plurality of pieces of division data, assign a plurality of tags to the plurality of pieces of division data, each of the plurality of tags including a coordinate value for a corresponding piece of division data, obtain second data based on at least one of the first data and the plurality of tags for the plurality of pieces of division data, and provide an address and the second data to the second memory. The address and the second data are obtained based on the plurality of tags.

19 Claims, 14 Drawing Sheets

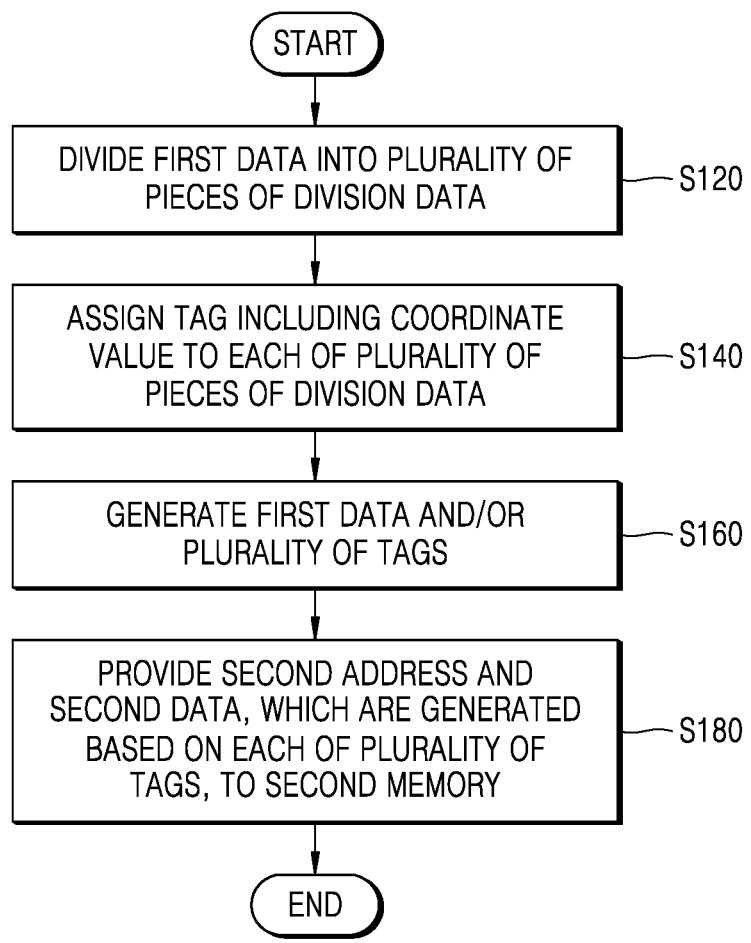

SYSTEM-ON-CHIP, DATA PROCESSING METHOD THEREOF, AND NEURAL NETWORK DEVICE

CROSS-REFERENCE TO RELATED APPLICATION

This application claims priority under 35 U.S.C. § 119 to Korean Patent Application No. 10-2020-0021128, filed on Feb. 20, 2020, in the Korean Intellectual Property Office, the disclosure of which is incorporated herein in its entirety by reference.

BACKGROUND

Apparatuses and methods consistent with exemplary embodiments relate to a System-on-Chip (SoC), a data processing method of the SoC, and a neural network device, and more particularly, to an SoC configured to convert a data format, a data processing method of the SoC, and a neural network device.

A neural network refers to a computational architecture that is modeled on a biological brain. In recent years, with the development of neural network technology, a vast amount of research has been conducted into techniques of analyzing input data and extracting valid information by using a neural network device based on at least one neural network model in various kinds of electronic systems.

Some studies of neural network devices are focused on increasing energy efficiency within such a range as not to reduce performance or within such a range as to prevent the reduction of performance. Thus, there is a need for a technique of reducing computational complexity and increasing operation speed in a device using a neural network without reducing performance or accuracy or while preventing the reduction of performance or accuracy.

In particular, in a device configured to accelerate a neural network, there may be many cases in which data in a three-dimensional (3D) format is converted. A technique of converting the data in the 3D format and efficiently storing the data in the 3D format in a memory is required.

SUMMARY

Provided are a System-on-Chip (SoC), a data processing method of the SoC, and a neural network device, which may convert data in a three-dimensional (3D) format without additional dedicated hardware and store the converted data in a memory.

According to an aspect of an exemplary embodiment, there is provided an SoC including: a first memory configured to store first data; a second memory; and a data processing circuit configured to: divide the first data obtained from the first memory into a plurality of pieces of division data, assign a plurality of tags to the plurality of pieces of division data, each of the plurality of tags comprising a coordinate value for a corresponding piece of division data, obtain second data based on at least one of the first data and the plurality of tags for the plurality of pieces of division data, and provide an address and the second data to the second memory, wherein the address and the second data are obtained based on the plurality of tags.

According to another aspect of another exemplary embodiment, there is provided a data conversion method of an SoC. The method incudes: dividing first data obtained from a first memory into a plurality of pieces of division data; assigning a plurality of tags to the plurality of pieces of division data, each of the plurality of tags comprising a coordinate value for a corresponding piece of division data; obtaining a transform matrix using affine transform matrices of single-axis rotation, based on a given transformation condition; transforming coordinate values included in the plurality of tags for the plurality of pieces of division data using the obtained transform matrix; and storing the plurality of pieces of division data in a second memory, based on the transformed coordinate values corresponding to the plurality of pieces of division data.

According to an aspect of another exemplary embodiment, there is provided a data padding method of an SoC. The method includes: assigning a plurality of tags to a plurality of pieces of division data into which first data is divided, each of the plurality of tags comprising a coordinate value for a corresponding piece of division data; determining whether each of the plurality of pieces of division data requires padding, based on the coordinate value included in each of the plurality of assigned tags; generating padding data for a piece of division data, which is determined to require padding, from among the plurality of pieces of division data; transforming a coordinate value of the piece of division data, which is determined to require padding, based on a type of padding; and storing the generated padding data in a memory using the transformed coordinate value.

According to an aspect of another exemplary embodiment, there is provided a neural network device configured to accelerate a neural network. The neural network device includes: a dynamic random access memory (DRAM) device configured to store first data in a three-dimensional (3D) format; a static random access memory (SRAM) device configured to store second data into which the first data is converted; a neural network processor configured to accelerate the neural network using the second data obtained from the SRAM device; and a data processing circuit configured to: assign a plurality of tags to a plurality of pieces of division data into which the first data is divided, each of the plurality of tags comprising a coordinate value for a corresponding piece of division data, obtain the second data based on at least one of the first data and the plurality of tags for the plurality of pieces of division data, and provide an address and the second data to the SRAM device, wherein the address and the second data are obtained based on the plurality of tags.

BRIEF DESCRIPTION OF THE DRAWINGS

Embodiments will be more clearly understood from the following detailed description taken in conjunction with the accompanying drawings in which:

FIG. 2 is a flowchart of a data processing method of an SoC, according to an exemplary embodiment;

DETAILED DESCRIPTION OF THE EMBODIMENTS

Hereinafter, exemplary embodiments will be described in detail with reference to the accompanying drawings. Throughout the disclosure, expressions such as "at least one of a, b or c" (or "at least one of a, b, and c") indicates only a, only b, only c, both a and b, both a and c, both b and c, or all of a, b, and c.

Figure 1:
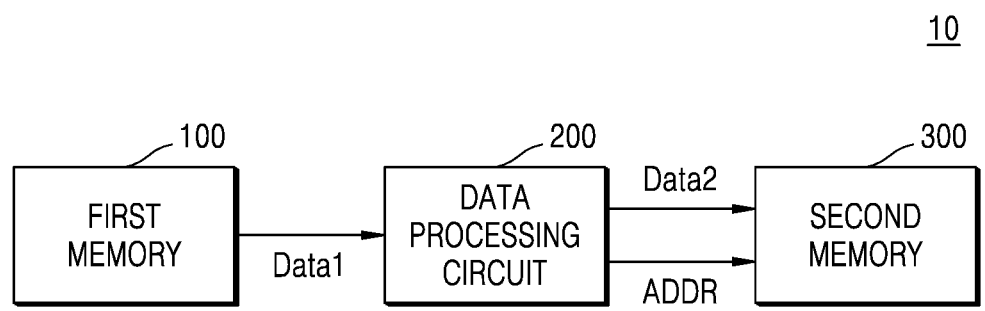
FIG. 1 illustrates a System-on-Chip (SoC) according to an exemplary embodiment.

FIG. 1 illustrates a System-on-Chip (SoC) 10 according to an exemplary embodiment. The SoC 10 may include a first memory 100, a data processing circuit 200, and a second memory 300. The SoC 10 may be included in various devices. For example, the SoC 100 may be included in a device, such as an ultra-mobile personal computer (UMPC), a workstation, a netbook, a personal digital assistant (PDA), a portable computer, a web tablet, a wireless phone, a mobile phone, a smartphone, an electronic book (e-book), a portable multimedia player (PMP), a portable game console, a navigation device, a black box, a digital camera, etc. In addition, the SoC 10 may be implemented in a neural network device configured to accelerate a neural network.

The first memory 100 may store control information (e.g., various pieces of data, programs, and instructions), which is used for the SoC 10. In an exemplary embodiment, the first memory 100 may be implemented as a volatile memory. The volatile memory may include at least one of dynamic random access memory (DRAM), synchronous DRAM (SDRAM), double data rate (DDR) SDRAM, low-power DDR (LPDDR) SDRAM, graphics DDR (GDDR) SDRAM, Rambus DRAM (RDRAM), and static RAM (SRAM). The first memory 100 may store first data DATA1 and provide the first data DATA1 to the data processing circuit 200. In an exemplary embodiment, the first data DATA1 may have a three-dimensional (3D) format. In other words, the first data DATA1 may be 3D-format data.

The second memory 300 may also store control information (e.g., various pieces of data, programs, and instructions), which is used for the SoC 10. In an exemplary embodiment, the second memory 300 may be implemented as a volatile memory. The volatile memory may include at least one of DRAM, SDRAM, DDR SDRAM, LPDDR, SDRAM, GDDR SDRAM, RDRAM, and SRAM. The second memory 300 may store second data DATA2 provided by the data processing circuit 200.

The data processing circuit 200 may process the first data DATA1 provided by the first memory 100 and provide the second data DATA2 and an address ADDR such that the second memory 300 stores the second data DATA2. In an exemplary embodiment, the data processing circuit 200 may convert the first data DATA1 into the second data DATA2 by applying at least one of various data processing methods, such as at least one of a rotation method, a transpose method, a flip method, a permute method, etc., and store the second data DATA2 in the second memory 300.

In an exemplary embodiment, the data processing circuit 200 may divide the first data DATA1 into a plurality of pieces of division data. In other words, the data processing circuit 200 may divide the first data DATA1 into predetermined data units and obtain the plurality of pieces of division data. Here, a data unit may correspond to a width of a data pipeline.

In an exemplary embodiment, the data processing circuit 200 may assign a tag to each of the plurality of pieces of division data. Here, the tag may include a coordinate value assigned to the corresponding division data. For example, the coordinate value may indicate a coordinate value of specific data (or data at a specific position) of the division data in the first data DATA1. It is understood, however, that one or more other exemplary embodiments are not limited thereto. For example, the coordinate value may indicate a coordinate value assigned to each piece of division data, based on structures of pieces of division data.

In an exemplary embodiment, the data processing circuit 200 may generate the second data DATA2, based on the first data DATA1 and/or a plurality of tags. For example, the data processing circuit 200 may apply a data processing method, such as at least one of a rotation method, a transpose method, a flip method, etc., to the first data DATA1 and generate the second data DATA2. The data processing circuit 200 may convert each of the plurality of pieces of division data based on a tag corresponding thereto, obtain a piece of converted division data, and output pieces of converted division data as the second data DATA2. Here, the conversion process may also be applied to a case in which output data is the same as input data. For example, the data processing circuit 200 may output the first data DATA1 as the second data DATA2.

In an exemplary embodiment, the data processing circuit 200 may obtain an address ADDR based on each of the plurality of tags. For example, the data processing circuit 200 may generate an address ADDR indicating a physical address, based on the coordinate value included in the tag corresponding to each of the plurality of pieces of division data and/or the transformed coordinate value. The physical address may indicate a position at which data will be stored in the second memory 300.

The data processing circuit 200 may provide the address ADDR and the second data DATA2 and store (or control to store) the second data DATA2 in a converted format in the second memory 300.

The SoC 10 according to an exemplary embodiment may convert data in a 3D format without additional dedicated hardware and store the converted data in the second memory 300. In addition, the SoC 10 according to an exemplary embodiment may assign a tag to a unit of division data and efficiently perform a data padding operation.

FIG. 2 is a flowchart of a data processing method of an SoC 10, according to an exemplary embodiment. FIG. 2 is described below with reference to FIG. 1.

Referring to FIGS. 1 and 2, the SoC 10 may divide first data DATA1, which is provided by the first memory 100, into a plurality of pieces of division data (operation S120). For example, the data processing circuit 200 may divide the first data DATA1 into the plurality of pieces of division data. In an exemplary embodiment, the plurality of pieces of division data may have a predetermined data size and have, for example, a size corresponding to a width of a data pipeline.

The SoC 10 may assign a tag including a coordinate value to each of the plurality of pieces of division data (operation S140). For example, the data processing circuit 200 may assign a coordinate value to each of the plurality of pieces of division data and generate a tag including the coordinate value. A method of assigning the coordinate value is described in further detail below with reference to FIGS. 3A and 3B.

The SoC 10 may generate second data DATA2, based on the first data DATA1 and/or a plurality of tags generated due to operation S140 (operation S160). For example, the data processing circuit 200 may obtain a plurality of pieces of converted division data, based on the plurality of pieces of division data included in the first data DATA1 and/or tags corresponding respectively thereto, and output the plurality of pieces of converted division data as the second data DATA2.

The SoC 10 may obtain an address ADDR corresponding to each of the plurality of tags, based on each of the plurality of tags, and provide the obtained address ADDR and the second data DATA2 to the second memory 300 (operation S180). For example, the data processing circuit 200 may obtain an address ADDR corresponding to each of the plurality of pieces of division data and control the second memory 300 such that the second data DATA2 is stored in memory cells corresponding to the obtained address ADDR in the second memory 300.

The SoC 10 according to an exemplary embodiment may convert data in a 3D format without additional dedicated hardware and store the converted data in the second memory 300. In addition, the SoC 10 according to an exemplary embodiment may assign a tag to a unit of division data and efficiently perform a data padding operation.

Hereinafter, specific examples will be described with reference to exemplary embodiments.

Figure 3A:
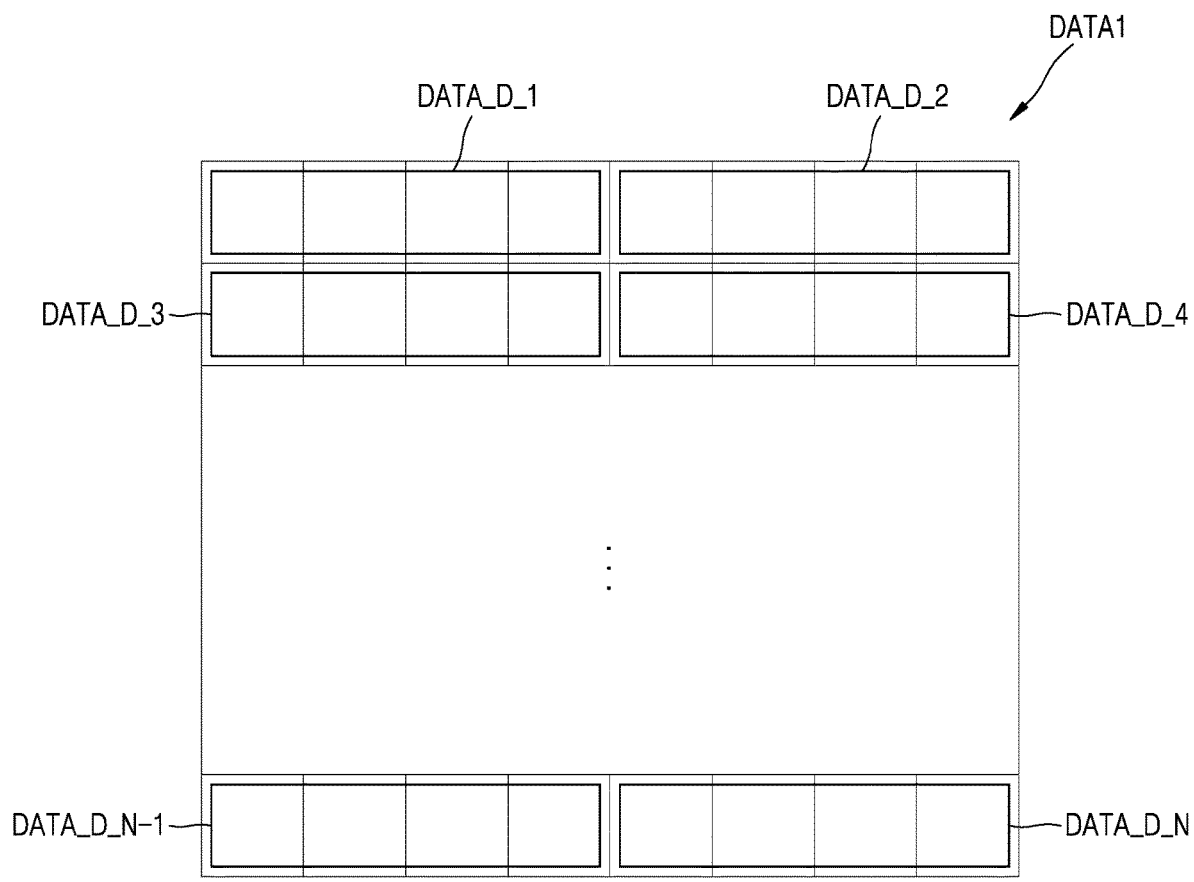
FIGS. 3A and 3B illustrate first data and a plurality of pieces of division data according to an exemplary embodiment.
Figure 3B:
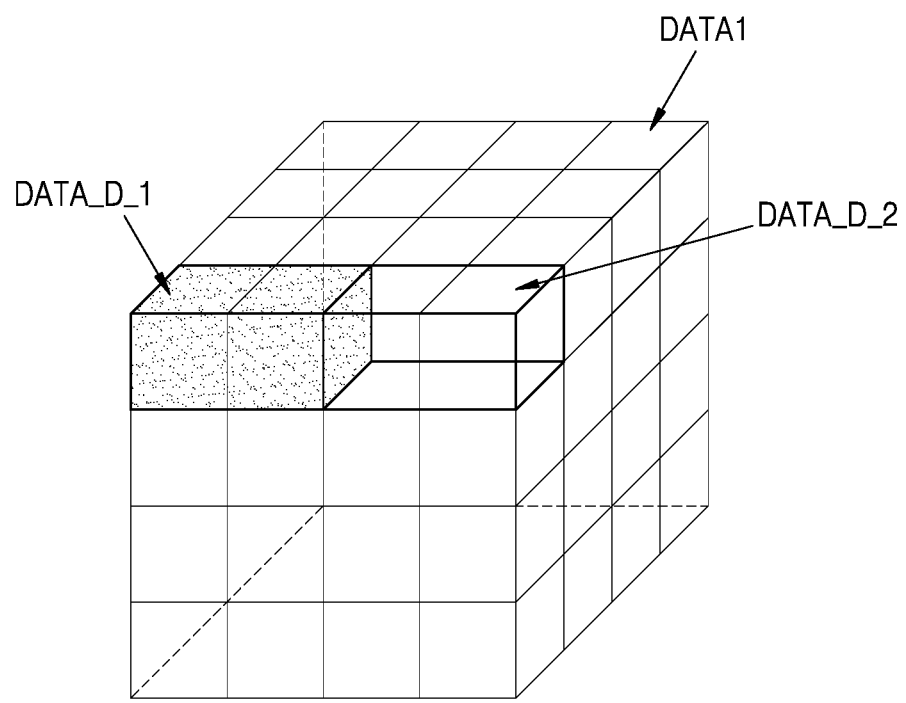

FIGS. 3A and 3B illustrate first data DATA1 and a plurality of pieces of division data according to an exemplary embodiment. FIGS. 3A and 3B are described below with reference to FIG. 1.

Referring to FIG. 3A, the first data DATA1 may have a two-dimensional (2D) format. The 2D format may have a 2D matrix shape. The first data DATA1 may be divided into predetermined data units, for example, a plurality of pieces of division data. For example, the first data DATA1 may be divided into a plurality of pieces of division data, which may include first division data DATA_D_1, second division data DATA_D_2, third division data DATA_D_3, fourth division data DATA_D_4, N-1-th division data DATA_D_N-1, and N-th division data DATA_D_N. The data processing circuit 200 may assign a coordinate value to each of the plurality of pieces of division data. According to an exemplary embodiment, the data processing circuit 200 may assign a coordinate value of data located at a predetermined position in each of the plurality of pieces of division data, as a coordinate value of division data. For example, where a coordinate value of top left data in the pieces of division data is selected, the data processing circuit 200 may assign a coordinate value of (1, 1) to the first division data DATA_D_1, assign a coordinate value of (1, 5) to the second division data DATA_D_2, assign a coordinate value of (2, 1) to the third division data DATA_D_3, and assign a coordinate value of (2, 5) to the fourth division data DATA_D_4. It is understood, however, that one or more other exemplary embodiments are not limited thereto. In this regard, the data processing circuit 200 may assign a coordinate value, which is determined according to a relative position between the plurality of pieces of division data, as a coordinate value of division data. For example, the data processing circuit 200 may assign a coordinate value of (1, 1) to the first division data DATA_D_1, assign a coordinate value of (1, 2) to the second division data DATA_D_2, assign a coordinate value of (2, 1) to the third division data DATA_D_3, and assign a coordinate value of (2, 2) to the fourth division data DATA_D_4.

Referring to FIG. 3B, the first data DATA1 may have a 3D format. The 3D format may have a 3D matrix shape. The first data DATA1 may be divided into predetermined data units, for example, a plurality of pieces of division data. For example, the first data DATA1 may be divided into a plurality of pieces of division data, which may include first division data DATA_D_1 and second division data DATA_D_2. The data processing circuit 200 may assign a coordinate value to each of the plurality of pieces of division data. The data processing circuit 200 may assign a coordinate value of data located at a predetermined position in each of the plurality of pieces of division data, as a coordinate value of division data. For example, in an embodiment in which a coordinate value of top left data among the pieces of division data is selected (or determined), the data processing circuit 200 may assign a coordinate value of (1, 1, 1) to the first division data DATA_D_1 and assign a coordinate value of (3, 1, 1) to the second division data DATA_D_2. It is understood, however, that one or more other embodiments are not limited thereto. In this regard, the data processing circuit 200 may assign a coordinate value, which is determined according to a relative position between the plurality of pieces of division data, as a coordinate value of division data. For example, the data processing circuit 200 may assign a coordinate value of (1, 1, 1) to the first division data DATA_D_1 and assign a coordinate value of (2, 1, 1) to the second division data DATA_D_2. In other words, a 3D-type extension of a coordinate value assigning method shown in FIG. 3A may correspond to a coordinate value assigning method shown in FIG. 3B.

Figure 4:
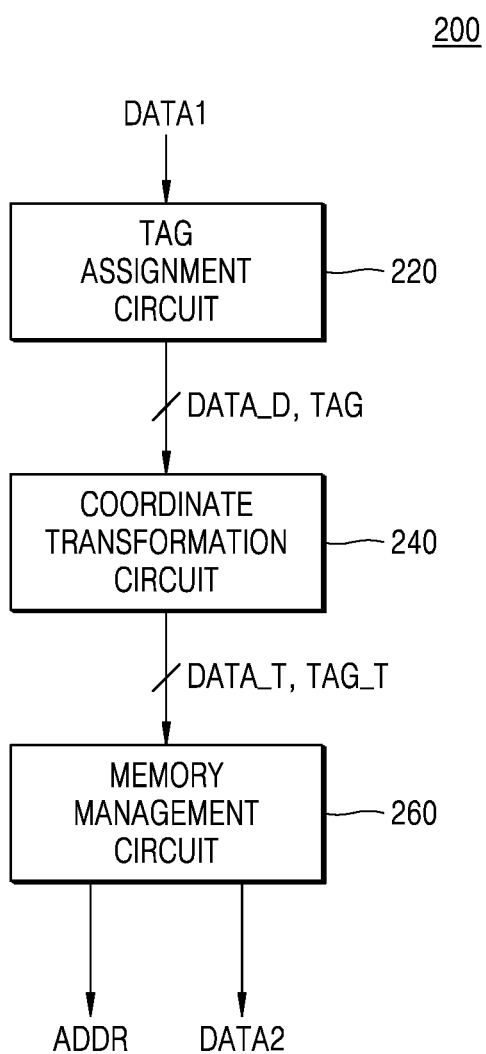
FIG. 4 illustrates a data processing circuit according to an exemplary embodiment.

FIG. 4 illustrates the data processing circuit 200 of FIG. 1, according to an exemplary embodiment. Redundant descriptions as provided above with reference to the previous drawings may be omitted below with reference to FIG. 4. FIG. 4 is described below with reference to FIG. 1.

The data processing circuit 200 may include a tag assignment circuit 220, a coordinate transformation circuit 240, and a memory management circuit 260.

The tag assignment circuit 220 may divide the first data DATA1 into a plurality of pieces of division data DATA_D. A tag including a coordinate value may be assigned to each of the plurality of pieces of division data DATA_D to obtain a plurality of tags TAG. A method of assigning coordinate values may be as described above with reference to FIGS. 3A and 3B. The tag assignment circuit 220 may provide the plurality of pieces of division data DATA_D and the plurality of tags TAG to the coordinate transformation circuit 240.

Moreover, the tag assignment circuit 220 may be implemented in various forms. According to an exemplary embodiment, the tag assignment circuit 220 may be implemented in hardware or software. When the tag assignment circuit 220 is implemented in hardware, the tag assignment circuit 220 may include circuits configured to divide the first data DATA1 into the plurality of pieces of division data DATA_D and assign a tag TAG to each piece of division data DATA_D. Also, for example, when the tag assignment circuit 220 is implemented in software, programs and/or instructions loaded in an arbitrary memory of the SoC 10 may be executed by at least one processor of the SoC 10. Thus, the tag assignment circuit 220 may divide the first data DATA1 into the plurality of pieces of division data DATA_D and assign a tag TAG to each piece of division data DATA_D. It is understood, however, that one or more other embodiments are not limited thereto, and the tag assignment circuit 220 may be implemented in a combination (e.g., firmware) of software and hardware.

The coordinate transformation circuit 240 may transform coordinate values included in the plurality of tags TAG and obtain transformed coordinate values. The coordinate transformation circuit 240 may include a plurality of transformed tags TAG_T including the transformed coordinate values. The coordinate transformation circuit 240 may provide the plurality of pieces of division data DATA_D and the plurality of transformed tags TAG_T to the memory management circuit 260.

Moreover, the coordinate transformation circuit 240 may be implemented in various forms. According to an exemplary embodiment, the coordinate transformation circuit 240 may be implemented in hardware or software. When the coordinate transformation circuit 240 is implemented in hardware, the coordinate transformation circuit 240 may include circuits configured to transform coordinate values included in the plurality of tags TAG and obtain the plurality of transformed tags TAG_T. When the coordinate transformation circuit 240 is implemented in software, programs and/or instructions included in an arbitrary memory of the SoC 10 may be executed by at least one processor of the SoC 10 to obtain the plurality of transformed tags TAG_T. It is understood, however, that one or more other embodiments are not limited thereto, and the coordinate transformation circuit 240 may be implemented in a combination (e.g., firmware) of software and hardware.

The memory management circuit 260 may output second data DATA2 and addresses ADDR based on the plurality of pieces of division data DATA_D and the plurality of transformed tags TAG_T. According to an exemplary embodiment, the memory management circuit 260 may transform a coordinate value corresponding to a virtual address included in each of the plurality of transformed tags TAG_T into a physical address and obtain an address ADDR. The memory management circuit 260 may store the plurality of pieces of division data DATA_D based on the addresses ADDR obtained for the respective tags TAG and store the second data DATA2 in a converted format in the second memory 300.

Figure 5:
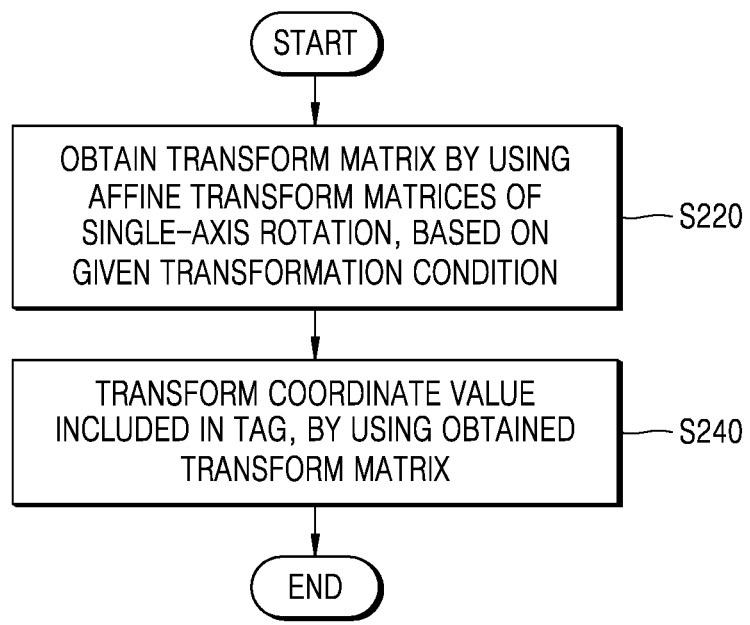
FIG. 5 is a flowchart of a data processing method of a data processing circuit, according to an exemplary embodiment.

FIG. 5 is a flowchart of a data processing method of the data processing circuit 200 of FIG. 1, according to an exemplary embodiment. The flowchart of FIG. 5 is described below with reference to FIGS. 1 and 4.

The data processing circuit 200 may obtain a transform matrix using affine transform matrices of single-axis rotation, based on a given transformation condition (operation S220). The given transformation condition may be a concept including a type of transformation. For example, types of transformation may include at least one of rotation transformation, transpose transformation, flip transformation, and permute transformation. An affine transform matrix of single-axis rotation may indicate a rotation transform matrix used to rotate coordinates of a specific point, based on a single axis. For example, a first affine transform matrix Rx to be rotated by an angle of theta θ about an x-axis is as shown in Equation 1 below. Here, each of Tx, Ty, and Tz denotes a translation constant indicating a degree of translation in each of x-, y-, and z-axial directions.

$$R_x = \begin{pmatrix} 1 & 0 & 0 & T_x \\ 0 & \cos\theta & -\sin\theta & T_y \\ 0 & \sin\theta & \cos\theta & T_z \\ 0 & 0 & 0 & 1 \end{pmatrix} \quad \text{[Equation 1]}$$

Similarly, a second affine transform matrix Ry to be rotated by the angle of theta θ about a y-axis is as shown in Equation 2 below. Here, each of Tx, Ty, and Tz denotes a translation constant indicating a degree of translation in each of x-, y-, and z-axial directions.

$$R_y = \begin{pmatrix} \cos\theta & 0 & \sin\theta & T_x \\ 0 & 1 & 0 & T_y \\ -\sin\theta & 0 & \cos\theta & T_z \\ 0 & 0 & 0 & 1 \end{pmatrix} \quad \text{[Equation 2]}$$

Similarly, a third affine transform matrix Rz to be rotated by the angle of theta θ about a z-axis is as shown in Equation 3 below. Here, each of Tx, Ty, and Tz denotes a translation constant indicating a degree of translation in each of x-, y-, and z-axial directions.

$$R_z = \begin{pmatrix} \cos\theta & -\sin\theta & 0 & T_x \\ \sin\theta & \cos\theta & 0 & T_y \\ 0 & 0 & 1 & T_z \\ 0 & 0 & 0 & 1 \end{pmatrix} \quad \text{[Equation 3]}$$

In an exemplary embodiment, the data processing circuit 200 may obtain the transform matrix by combining the first affine transform matrix Rx, the second affine transform matrix Ry, and the third affine transform matrix Rz, based on the given transformation condition.

In an exemplary embodiment, the angle of theta θ for the first affine transform matrix Rx, the second affine transform matrix Ry and the third affine transform matrix Rz may be only an integer multiple of 90 degrees. For example, the angle of theta θ may have values of 0, 90, 180, and 270 degrees. It can be inferred that angles obtained by adding or subtracting a value of an integer multiple of 360 degrees to or from the angle of theta θ are substantially the same due to the periodicity of angles. Thus, each of the affine transform matrices may have only an element value of 1, 0, or −1. In this case, 48 transform matrices may be obtained by combining the first affine transform matrix Rx, the second affine transform matrix Ry, and the third affine transform matrix Rz.

The data processing circuit 200 may transform a coordinate value included in a tag corresponding to each of a plurality of transform matrices by using the transform matrix obtained in operation S220 and obtain a transformed coordinate value (operation S240). For example, the coordinate transformation circuit 240 may obtain a plurality of transformed coordinate values for the plurality of transform matrices and output a plurality of transformed tags TAG_T.

Exemplary embodiments in which coordinates are transformed are described in further detail below with reference to FIGS. 6, 7A, and 7B.

Figure 6:
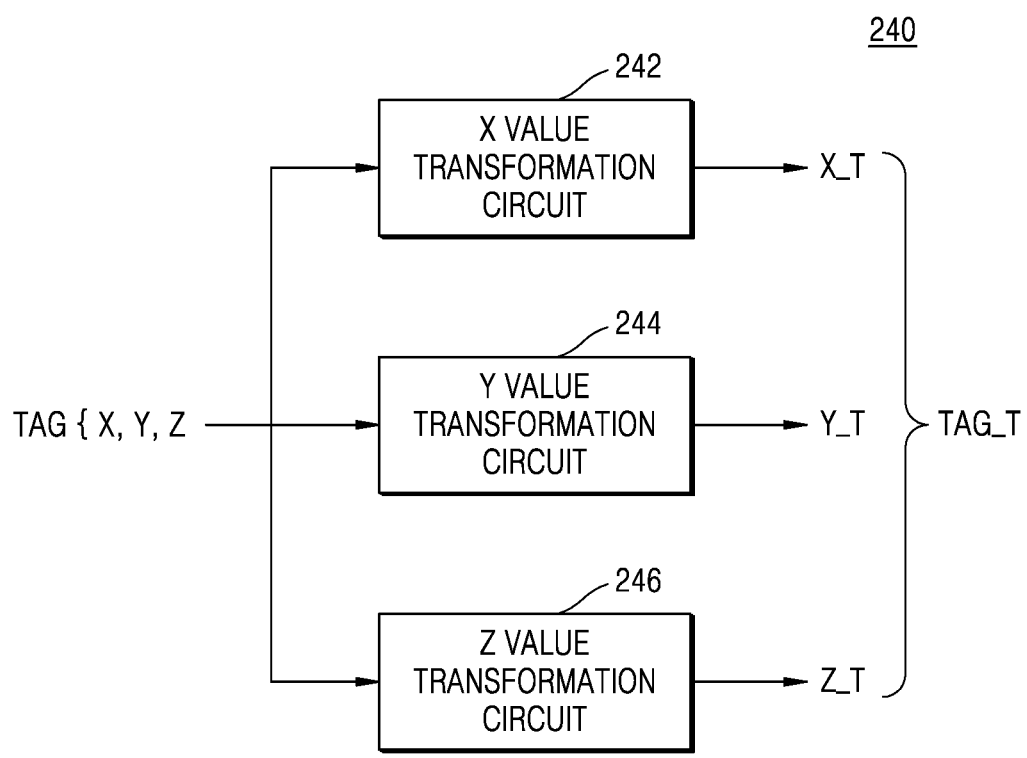
FIG. 6 illustrates a coordinate transformation circuit according to an exemplary embodiment.

FIG. 6 illustrates a coordinate transformation circuit 240 according to an exemplary embodiment. The coordinate transformation circuit 240 may include an X-value transformation circuit 242, a Y-value transformation circuit 244, and a Z-value transformation circuit 246. Each of a plurality of tags TAG may include a coordinate value, which may include an X-value X, a Y-value Y, and a Z-value Z.

The X-value transformation circuit 242 may obtain a transformed X-value X_T, based on the X-value X, the Y-value Y, and the Z-value Z.

The Y-value transformation circuit 244 may obtain a transformed Y-value Y_T, based on the X-value X, the Y-value Y, and the Z-value Z.

The Z-value transformation circuit 246 may obtain a transformed Z-value Z_T, based on the X-value X, the Y-value Y, and the Z-value Z.

In an exemplary embodiment, the X-value transformation circuit 242 may perform a linear combination of the X-value X, the Y-value Y, and the Z-value Z and obtain the transformed X-value X_T. For example, the X-value transformation circuit 242 may obtain the transformed X-value X_T by the following Equation 4:

$$X\_T = a*X + b*Y + c*Z + Tx \quad \text{[Equation 4]}$$

wherein a, b, and c denote coefficients of linear combination, and each of a, b, and c may have a value of 1, 0, or −1. Tx may denote an x-axial translation constant.

Similarly, the Y-value transformation circuit 244 may perform a linear combination of the X-value X, the Y-value Y, and the Z-value Z and obtain the transformed Y-value Y_T. An equation for obtaining the transformed Y-value Y_T is similar to Equation 4 except for specific values of coefficients and a translation constant of the linear combination.

Similarly, the Z-value transformation circuit 246 may perform a linear combination of the X-value X, the Y-value Y, and the Z-value Z and obtain the transformed Z-value Z_T. An equation for obtaining the transformed Z-value Z_T is similar to Equation 4 except for specific values of coefficients and a translation constant of the linear combination.

An exemplary embodiment of the X-value transformation circuit 242 is described below with reference to FIGS. 7A and 7B.

Figure 7A:
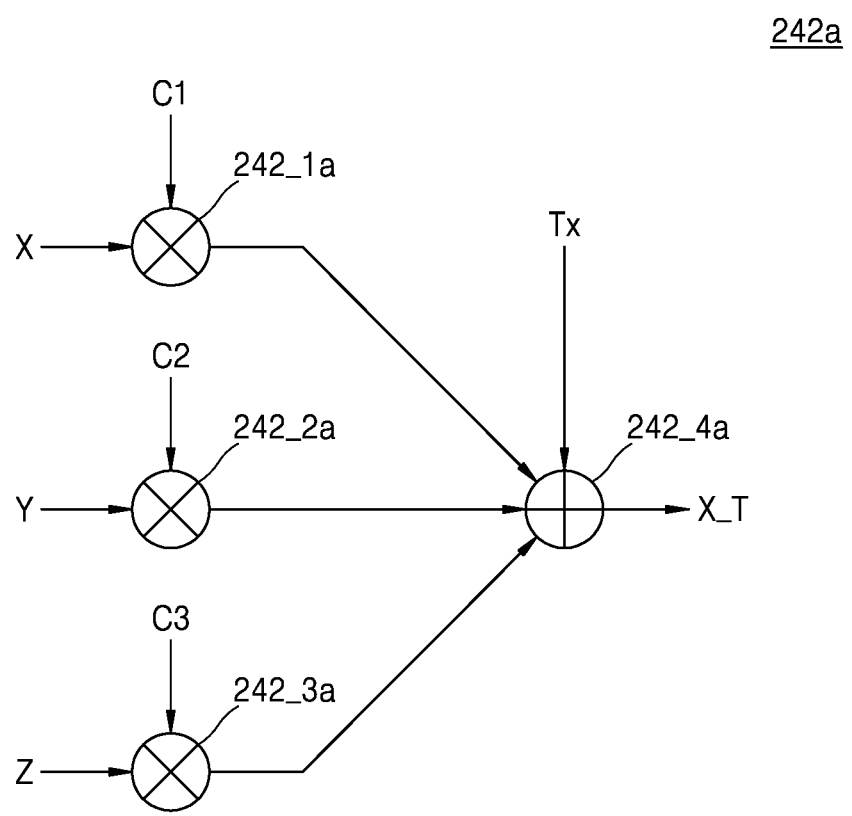
FIGS. 7A and 7B illustrate X-value transformation circuits according to exemplary embodiments.
Figure 7B:
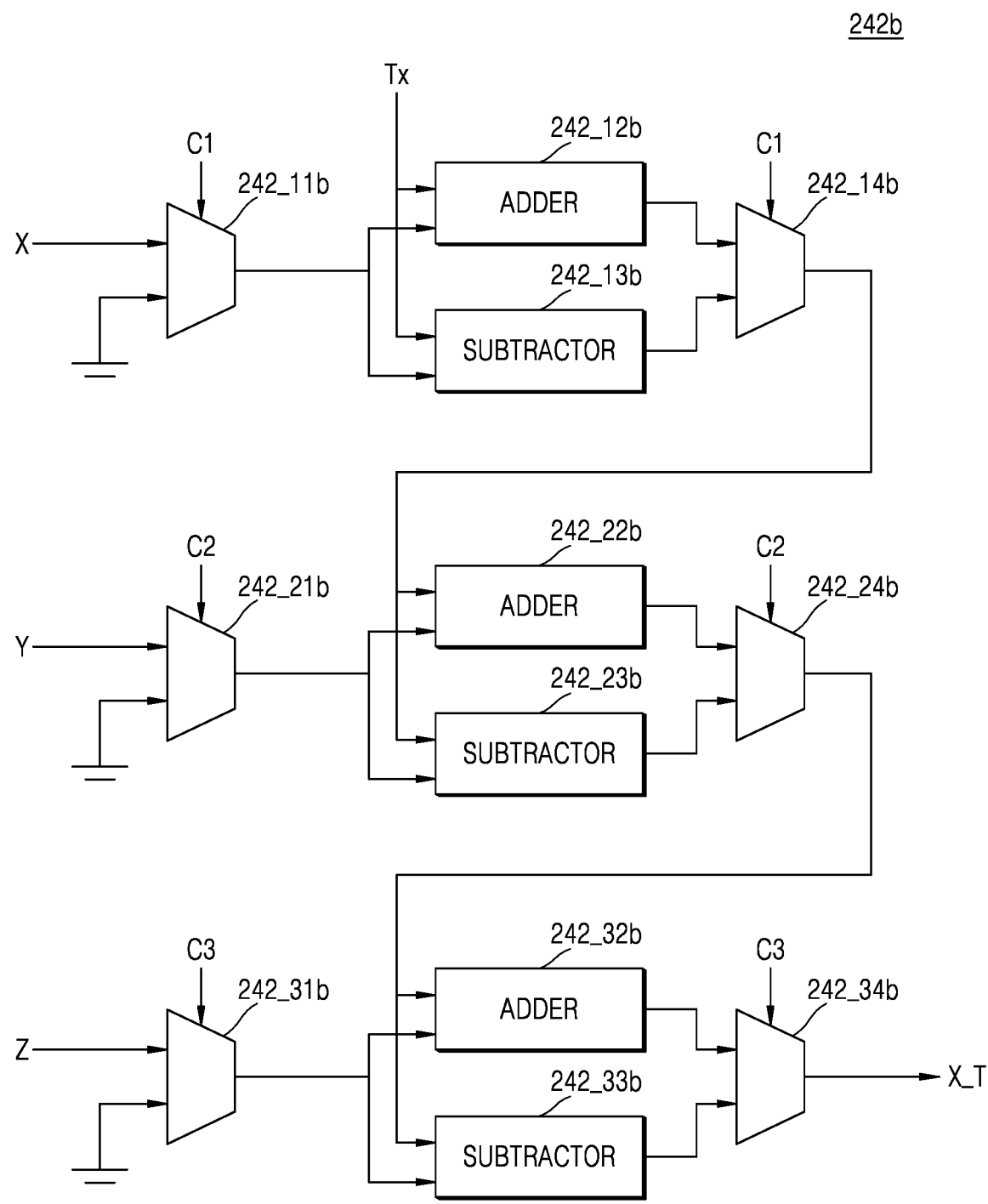

FIGS. 7A and 7B illustrate X-value transformation circuits 242a and 242b according to exemplary embodiments. FIGS. 7A and 7B illustrate typical exemplary embodiments provided for the description of all of the X-value transformation circuit 242, the Y-value transformation circuit 244, and the Z-value transformation circuit 246 of FIG. 6. The same embodiments may also be applied to the Y-value transformation circuit 244 and the Z-value transformation circuit 246.

Referring to FIG. 7A, the X-value transformation circuit 242a may include a first multiplier 242_1a, a second multiplier 242_2a, a third multiplier 242_3a, and an adder 242_4a.

The first multiplier 242_1a may multiply an X-value X by a first coefficient C1 and output a first output value. In an exemplary embodiment, the first coefficient C1 may have a value of 1, 0, or −1.

The second multiplier 242_2a may multiply a Y-value Y by a second coefficient C2 and output a second output value. In an exemplary embodiment, the second coefficient C2 may have a value of 1, 0, or −1.

The third multiplier 242_3a may multiply a Z-value Z by a third coefficient C3 and output a third output value. In an exemplary embodiment, the third coefficient C3 may have a value of 1, 0, or −1.

The adder 242_4a may perform addition on the first output value, the second output value, and the third output value and output a transformed X-value X_T.

Referring to FIG. 7B, the X-value transformation circuit 242b may include a first multiplexer (MUX) 242_11b, a first adder 242_12b, a first subtractor 242_13b, a second MUX 242_14b, a third MUX 242_21b, a second adder 242_22b, a second subtractor 242_23b, a fourth MUX 242_24b, a fifth MUX 242_31b, a third adder 242_32b, a third subtractor 242_33b, and a sixth MUX 242_34b.

The first MUX 242_11b may select one of an X-value X and 0, which is transmitted from a ground node, based on a first coefficient C1.

The first adder 242_12b may perform addition on an output value of the first MUX 242_11b and an X-direction translation constant Tx.

The first subtractor 242_13b may perform subtraction on the output value of the first MUX 242_11b and the X-direction translation constant Tx.

The second MUX 242_14b may select one of an output value of the first adder 242_12b and an output value of the first subtractor 242_13b, based on the first coefficient C1.

The third MUX 242_21b may select one of the Y-value Y and 0, which is transmitted from the ground node, based on the second coefficient C2.

The second adder 242_22b may perform addition on an output value of the third MUX 242_21b and an output value of the second MUX 242_14b.

The second subtractor 242_23b may perform subtraction on the output value of the third MUX 242_21b and the output value of the second MUX 242_14b.

The fourth MUX 242_24b may select one of an output value of the second adder 242_22b and an output value of the second subtractor 242_23b, based on the second coefficient C2.

The fifth MUX 242_31b may select one of the Z-value Z and 0, which is transmitted from the ground node, based on the third coefficient C3.

The third adder 242_32b may perform addition on an output value of the fifth MUX 242_31b and an output value of the fourth MUX 242_24b.

The third subtractor 242_33b may perform subtraction on the output value of the fifth MUX 242_31b and the output value of the fourth MUX 242_24b.

The sixth MUX 242_34b may select one of an output value of the third adder 242_32b and an output value of the third subtractor 242_33b, based on the third coefficient C3.

In an exemplary embodiment, subtractors may be implemented by using 2's complements of inputs of adders, and thus, the logic of the entire circuit may be reduced.

Figure 8:
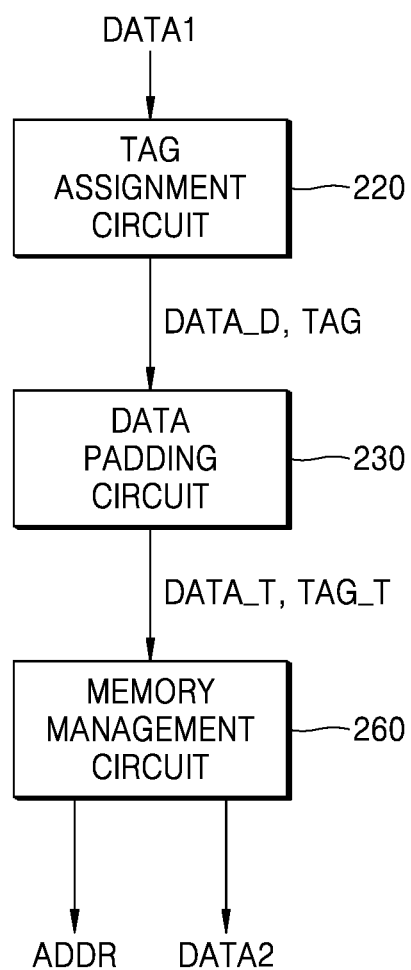
FIG. 8 illustrates a data processing circuit according to an exemplary embodiment.

FIG. 8 illustrates the data processing circuit 200 of FIG. 1, according to an exemplary embodiment. Redundant descriptions as provided above with reference to previous drawings may be omitted from the description of the data processing circuit 200 below with reference to FIG. 8. FIG. 8 is described below with reference to FIG. 1.

The data processing circuit 200 may include a tag assignment circuit 220, a data padding circuit 230, and a memory management circuit 260.

The tag assignment circuit 220 may divide first data DATA1 into a plurality of pieces of division data DATA_D. The tag assignment circuit 220 may assign a tag including a coordinate value to each of the plurality of pieces of division data DATA_D and obtain a plurality of tags TAG. A method of assigning coordinate values may be as described above with reference, for example, to FIGS. 3A and 3B. The tag assignment circuit 220 may provide the plurality of pieces of division data DATA_D and the plurality of tags TAG to the data padding circuit 230.

The data padding circuit 230 may transform coordinate values included in the plurality of tags TAG and obtain transformed coordinate values. The data padding circuit 230 may include a plurality of transformed tags TAG_T including the transformed coordinate values. The data padding circuit 230 may determine whether each of the plurality of pieces of division data DATA_D requires padding. For example, the data padding circuit 230 may determine whether each piece of division data DATA_D requires padding, based on padding constraints including a type of padding. In addition, the data padding circuit 230 may convert the pieces of division data DATA_D, based on the type of padding, and provide pieces of converted division data to the memory management circuit 260.

Moreover, the data padding circuit 230 may be implemented in various forms. According to an exemplary embodiment, the data padding circuit 230 may be implemented in hardware or software. When the data padding circuit 230 is implemented in hardware, the data padding circuit 230 may include circuits configured to transform coordinate values included in the plurality of tags TAG to obtain a plurality of transformed tags TAG_T, and generate padding data. In addition, for example, when the data padding circuit 230 is implemented in software, programs and/or instructions loaded in an arbitrary memory of the SoC 10 may be executed by at least one processor of the SoC 10. Thus, the plurality of transformed tags TAG_T may be obtained and the padding data may be generated. It is understood, however, that one or more other embodiments are not limited thereto, and the data padding circuit 230 may be implemented in a combination (e.g., firmware) of software and hardware.

The memory management circuit 260 may output second data DATA2 and addresses ADDR, based on the plurality of pieces of division data DATA_D and the plurality of transformed tags TAG_T. In an exemplary embodiment, the memory management circuit 260 may transform a coordinate value corresponding to a type of a virtual address included in each of the plurality of transformed tags TAG_T into a physical address and obtain an address ADDR. In an exemplary embodiment, the memory management circuit 260 may store the plurality of pieces of division data DATA_D in the second memory 300, based on addresses ADDR obtained for the respective tags TAG, and store the second data DATA2 in a converted format in the second memory 300.

Figure 9:
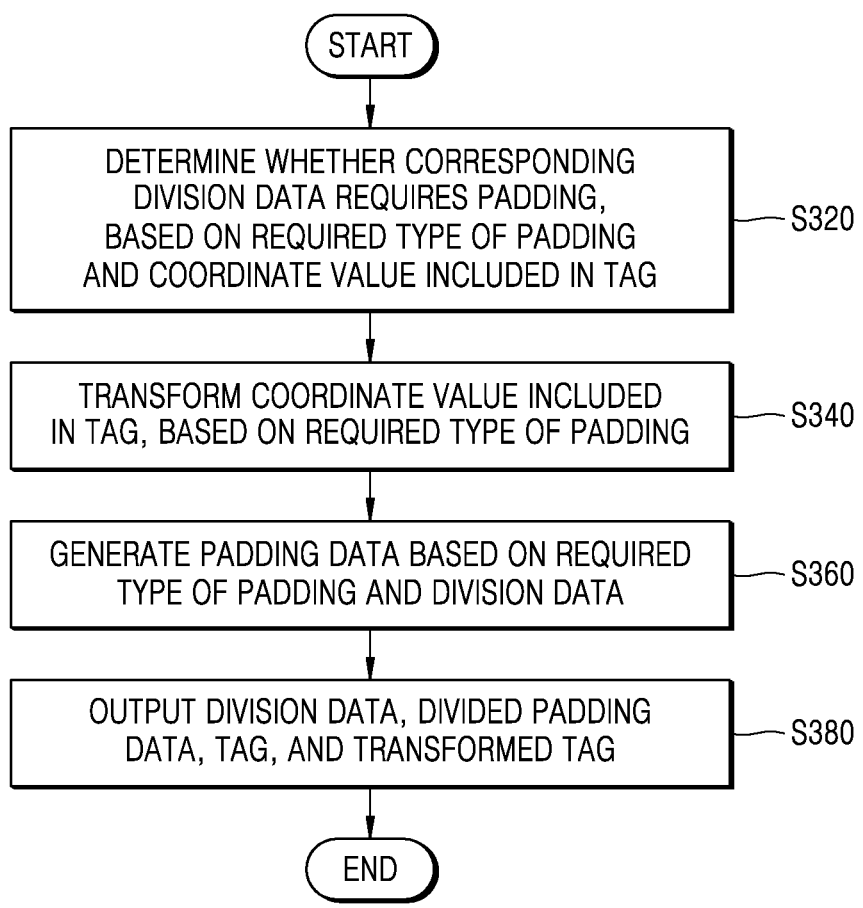
FIG. 9 is a flowchart of a data processing method of a data processing circuit, according to an exemplary embodiment.

FIG. 9 is a flowchart of a data processing method of a data processing circuit 200, according to an exemplary embodiment. FIG. 9 is described below with reference to FIGS. 1 and 8.

Referring to FIG. 9, the data processing circuit 200 may determine whether a piece of division data corresponding to a tag requires padding, based on a required type of padding and a coordinate value included in a tag (operation S320). For example, the type of padding may include various types of padding, such as repetition padding and mirror padding. In an exemplary embodiment, the data processing circuit 200 may compare the coordinate value with a predetermined boundary value and determine whether the corresponding division data requires padding.

The data processing circuit 200 may transform the coordinate value included in the tag, based on the required type of padding (operation S340). For example, when the type of padding corresponds to mirror padding, the data processing circuit 200 may mirror the coordinate value and transform the coordinate value.

The data processing circuit 200 may generate padding data, based on the required type of padding and the division data (operation S360). For example, in the case of repetition padding, the data processing circuit 200 may duplicate a piece of division data, which is determined to require padding, and generate padding data. In the case of mirror padding, the data processing circuit 200 may mirror a piece of division data, which is determined to require padding, and generate padding data.

The data processing circuit 200 may output a plurality of pieces of division data, pieces of padding data corresponding to pieces of division data, which require padding, and transformed tags including transformed coordinate values corresponding to the pieces of padding data (operation S380).

Figure 10A:
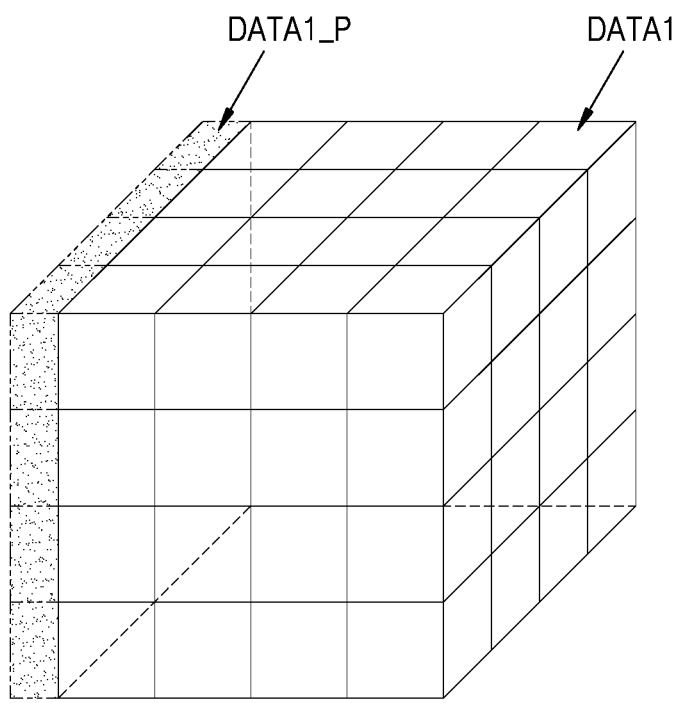
FIGS. 10A and 10B illustrate first data and padding data according to an exemplary embodiment.
Figure 10B:
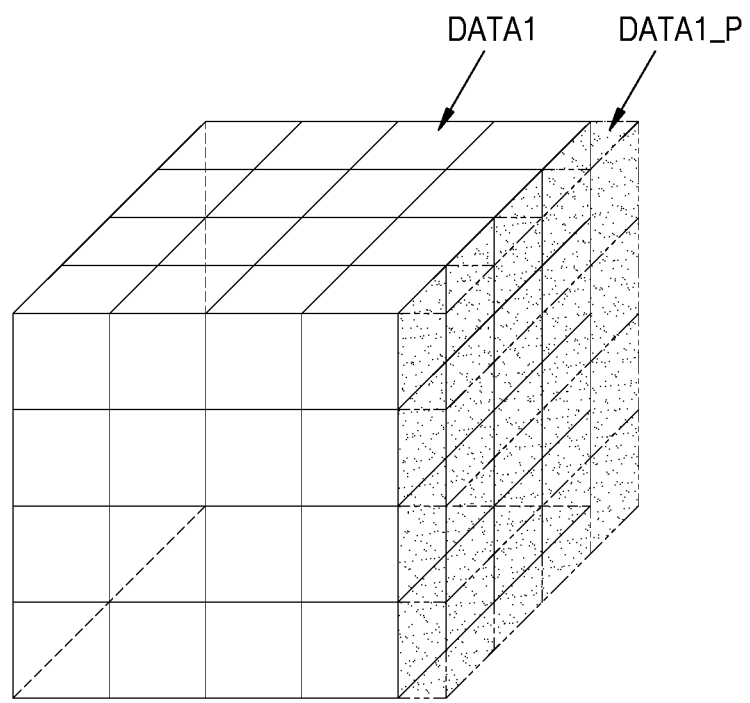

FIGS. 10A and 10B illustrate first data DATA1 and padding data DATA1_P according to an exemplary embodiment. FIGS. 10A and 10B illustrate an embodiment in which repetition padding is applied as a type of data padding. FIGS. 10A and 10B are described below with reference to FIGS. 1 and 8.

In particular, refereeing to FIG. 10A, when (or based on a determination that) data on a left side of the first data DATA1 requires padding (or is to be padded), the data processing circuit 200 may obtain padding data DATA1_P, based on pieces of division data including pieces of left data, and obtain a coordinate value corresponding to the padding data DATA1_P. The data processing circuit 200 may obtain an address ADDR, based on a transformed coordinate value and store the adding data DATA1_P in the obtained address ADDR.

Referring to FIG. 10B, when (or based on a determination that) data on a right side of the first data DATA1 requires padding (or is to be padded), the data processing circuit 200 may obtain padding data DATA1_P, based on pieces of division data including right data, and obtain a coordinate value corresponding to the padding data DATA1_P. The data processing circuit 200 may obtain an address ADDR, based on a transformed coordinate value, and store the padding data DATA1_P in the obtained address ADDR.

An SoC 10 according to an exemplary embodiment may divide the first data DATA1 into a plurality of pieces of division data, assign a tag to each of the plurality of pieces of division data, determine whether data requires padding (or is to be padded) by using the tag and the division data, and obtain the address ADDR to be stored in the second memory 300.

Figure 11:
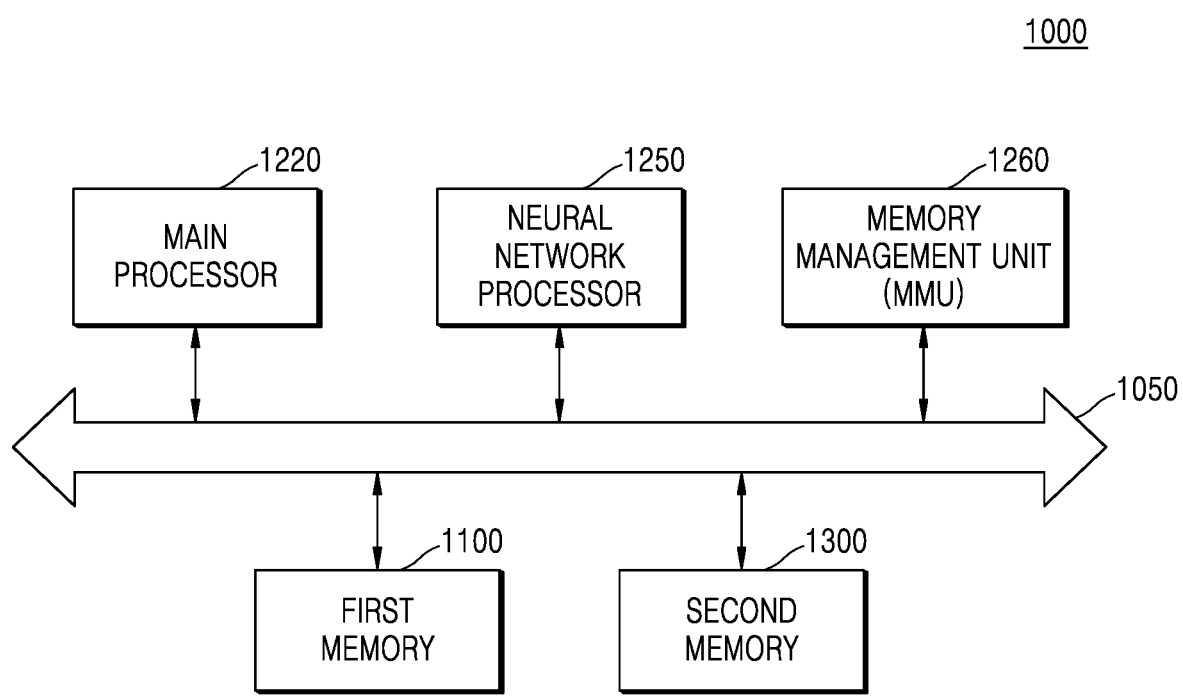
FIG. 11 illustrates a neural network device according to an exemplary embodiment.

FIG. 11 illustrates a neural network device 1000 according to an exemplary embodiment. The neural network device 1000 may analyze input data in real time, based on a neural network, extract valid information, and determine a situation or control components of an electronic device in which the neural network device 1000 is mounted, based on the extracted information. For example, the neural network device 1000 may be applied to drones, advanced drivers assistance systems (ADAS), smart TVs, smartphones, medical devices, mobile devices, image display devices, measuring devices, Internet of Things (IoT) devices, robotic devices, etc. In addition, the neural network device 1000 may be mounted in one of various types of electronic devices.

The neural network device 1000 may include at least one intellectual property (IP) block and a neural network processor 1250. The neural network device 1000 may include various kinds of IP blocks. For example, as shown in FIG. 11, the neural network device 1000 may include a main processor 1220, the neural network processor 1250, a memory management unit (MMU) 1260, a first memory 1100, and a second memory 1300. In addition, the neural network device 1000 may further include other general-use components, such as multi-format codecs (MFCs), video modules (e.g., a camera interface, a Joint Photographic Experts Group (JPEG) processor, a video processor, a mixer, etc.), 3D graphics cores, audio systems, display drivers, graphic processing units (GPUs), and digital signal processors (DSPs).

Components of the neural network device 1000, for example, the main processor 1220, the neural network processor 1250, the MMU 1260, the first memory 1100, and the second memory 1300, may transmit and receive data to and from each other through a system bus 1050. For example, an advanced microcontroller bus architecture (AMBA) (available from Advanced RISC Machine (ARM)) may be applied as a standard bus protocol to the system bus 1050. It is understood, however, that one or more other embodiments are not limited thereto, and various kinds of protocols may be applied to the system bus 1050.

The main processor 1220 may control the overall operation of the neural network device 1000. As an example, the main processor 1220 may be a central processing unit (CPU). The main processor 1220 may include a single core or a multi-core. The main processor 1220 may process or execute programs and/or data stored in the first memory 1100 and/or the second memory 1300. For example, the main processor 1220 may execute programs stored in the first memory 1100 and/or second memory 1300 and control various functions of the neural network device 1000.

The neural network processor 1250 may generate or update a neural network, train or learn the neural network, or perform an operation based on received input data, and generate an information signal based on a result of the operation and/or retrain the neural network. Models of the neural network may include various kinds of models, such as a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, deep belief network (DBN), a restricted Boltzmann machine (RBM), a fully convolutional network, a long short-term memory (LSTM) network, and a classification network, but are not limited thereto.

Exemplary embodiments described with reference to FIGS. 1, 2, 3A to 3B, 4 to 6, 7A to 7B, 8, 9, and 10A to 10B may be equally or similarly applied to the neural network device 1000 of FIG. 11. The first memory 1100 of FIG. 11 may correspond to the first memory 100 of FIGS. 1 to 10B, and the second memory 1300 of FIG. 11 may correspond to the second memory 300 of FIGS. 1 to 10B. The main processor 1220, the neural network processor 1250, and the MMU 1260 of FIG. 11 may correspond to the data processing circuit 200 of FIGS. 1 to 10B. In particular, the MMU 1260 of FIG. 11 may correspond to the memory management circuit 260 of FIGS. 4 to 10B.

The neural network device 1000 according to an exemplary embodiment may convert data in a 3D format without additional dedicated hardware and store the converted data in the second memory 1300. In addition, the neural network device 1000 according to an exemplary embodiment may assign a tag to a unit of division data and efficiently perform a data padding operation.

While exemplary embodiments have been particularly shown and described above, it will be understood that various changes in form and details may be made therein without departing from the spirit and scope of the following claims.

What is claimed is:

1. A System-on-Chip comprising:
    a first memory configured to store first data;
    a second memory; and
    a data processing circuit configured to:
        divide the first data obtained from the first memory into a plurality of pieces of division data,
        assign a plurality of tags to the plurality of pieces of division data, each of the plurality of tags comprising a coordinate value for a corresponding piece of division data,
        obtain second data based on at least one of the first data and the plurality of tags for the plurality of pieces of division data, and
        provide an address and the second data to the second memory, wherein the address and the second data are obtained based on the plurality of tags,
    wherein the data processing circuit comprises a coordinate transformation circuit configured to transform the coordinate value included in each of the plurality of tags and output a plurality of transformed tags, each transformed tag comprising a transformed coordinate value.

2. The System-on-Chip of claim 1, wherein the data processing circuit further comprises:
    a tag assignment circuit configured to assign the plurality of tags to the plurality of pieces of division data;
    a memory management circuit configured to provide the address to the second memory, based on transformed coordinate values included in the plurality of transformed tags, and provide the first data as the second data to the second memory.

3. The System-on-Chip of claim 2, wherein the coordinate transformation circuit is configured to obtain a transform matrix using affine transform matrices of single-axis rotation, based on a given transformation condition, and to transform the coordinate value included in each of the plurality of tags, using the obtained transform matrix.

4. The System-on-Chip of claim 2, wherein the coordinate transformation circuit comprises:
    a first transformation circuit configured to generate a transformed X coordinate value, based on an X coordinate value, a Y coordinate value, and a Z coordinate value included in each of the plurality of tags;
    a second transformation circuit configured to generate a transformed Y coordinate value, based on the X coordinate value, the Y coordinate value, and the Z coordinate value; and
    a third transformation circuit configured to generate a transformed Z coordinate value, based on the X coordinate value, the Y coordinate value, and the Z coordinate value.

5. The System-on-Chip of claim 4, wherein the first transformation circuit is configured to perform a linear combination of the X coordinate value, the Y coordinate value, and the Z coordinate value with a coefficient set comprising 1, 0, or −1, to generate the transformed X coordinate value.

6. The System-on-Chip of claim 4, wherein the first transformation circuit comprises:
    a first multiplier configured to multiply the X coordinate value by a first coefficient and output a first output value;
    a second multiplier configured to multiply the Y coordinate value by a second coefficient and output a second output value;
    a third multiplier configured to multiply the Z coordinate value by a third coefficient and output a third output value; and an adder configured to perform addition on the first output value, the second output value, the third output value, and a translation constant to generate the transformed X coordinate value.

7. The System-on-Chip of claim 4, wherein the first transformation circuit comprises:
a first multiplexer (MUX) configured to select one of the X coordinate value and 0 based on a first coefficient;
a first adder configured to perform addition on an output value of the first MUX and a translation constant;
a first subtractor configured to perform subtraction on the output value of the first MUX and the translation constant;
a second MUX configured to select an output value of the first adder and an output value of the first subtractor, based on the first coefficient;
a third MUX configured to select one of the Y coordinate value and 0, based on a second coefficient;
a second adder configured to perform addition on an output value of the third MUX and an output value of the second MUX;
a second subtractor configured to perform subtraction on the output value of the third MUX and the output value of the second MUX;
a fourth MUX configured to select one of an output value of the second adder and an output value of the second subtractor, based on the second coefficient;
a fifth MUX configured to select one of a Z coordinate value and 0, based on a third coefficient;
a third adder configured to perform addition on an output value of the fifth MUX and an output value of the fourth MUX;
a third subtractor configured to perform subtraction on the output value of the fifth MUX and the output value of the fourth MUX; and
a sixth MUX configured to select one of an output value of the third adder and an output value of the third subtractor, based on the third coefficient, and output the selected output value as the transformed X coordinate value.

8. The System-on-Chip of claim 2, wherein the data processing circuit comprises:
a tag assignment circuit configured to assign the plurality of tags to the plurality of pieces of division data included in the first data;
a data padding circuit configured to convert the first data, transform the coordinate value included in each of the plurality of tags, and output a plurality of transformed tags and the converted first data, wherein each of the plurality of transformed tags comprises the transformed coordinate value; and
a memory management circuit configured to provide the address to the second memory, based on transformed coordinate values included in the plurality of transformed tags, and provide the converted first data to the second memory.

9. The System-on-Chip of claim 8, wherein the data padding circuit is configured to determine whether a corresponding division data is to be padded, based on a required type of padding and a coordinate value included in the tag, and to transform the coordinate value included in the tag, based on the required type of padding.

10. The System-on-chip of claim 1, wherein the first memory comprises a dynamic random access memory (DRAM) memory device, and the second memory comprises a static random access memory (SRAM) memory device.

11. A data conversion method of a System-on-Chip, the method comprising:
dividing first data obtained from a first memory into a plurality of pieces of division data;
assigning a plurality of tags to the plurality of pieces of division data, each of the plurality of tags comprising a coordinate value for a corresponding piece of division data;
obtaining a transform matrix using affine transform matrices of single-axis rotation, based on a given transformation condition;
transforming coordinate values included in the plurality of tags for the plurality of pieces of division data using the obtained transform matrix; and
storing the plurality of pieces of division data in a second memory, based on the transformed coordinate values corresponding to the plurality of pieces of division data.

12. The method of claim 11, wherein the storing the plurality of pieces of division data in the second memory comprises:
obtaining addresses corresponding to the transformed coordinate values; and
storing the plurality of pieces of division data in the second memory by accessing the second memory based on the obtained addresses.

13. The method of claim 11, wherein:
the first data comprises data in a three-dimensional (3D) format; and
the assigning the plurality of tags comprises assigning a tag comprising a coordinate value corresponding to a coordinate value located at a corresponding position in the plurality of pieces of division data.

14. The method of claim 11, wherein the transform matrix comprises a 4×4 square matrix comprising only element values of 1, 0, or −1.

15. The method of claim 11, wherein the first memory comprises a dynamic random access memory (DRAM) memory device, and the second memory comprises a static RAM random access memory (SRAM) memory device.

16. A data padding method of a System-on-Chip, the method comprising:
assigning a plurality of tags to a plurality of pieces of division data into which first data is divided, each of the plurality of tags comprising a coordinate value for a corresponding piece of division data;
determining whether each of the plurality of pieces of division data requires padding, based on the coordinate value included in each of the plurality of assigned tags;
generating padding data for a piece of division data, which is determined to require padding, from among the plurality of pieces of division data;
transforming a coordinate value of the piece of division data, which is determined to require padding, based on a type of padding; and
storing the generated padding data in a memory using the transformed coordinate value.

17. The method of claim 16, wherein the assigning the plurality of tags comprises sequentially assigning coordinate values, based on a spatial arrangement of the plurality of pieces of division data.

18. The method of claim 16, wherein the generating the padding data comprises generating padding data corresponding to a piece of division data located on a side, from among the plurality of pieces of division data, based on the type of padding being repetition padding.

19. The method of claim 16, wherein the transforming the coordinate value comprises obtaining the transformed coordinate value by mirroring a coordinate value corresponding to a piece of division data located on a side, from among the plurality of pieces of division data, based on the type of paddingbeing mirror padding.

\* \* \* \* \*